J. J. ARPS
INVENTOR.

July 24, 1962
J. J. ARPS
3,046,474
BORE-HOLE LOGGING SYSTEM AND METHOD
Filed July 3, 1957
4 Sheets-Sheet 3
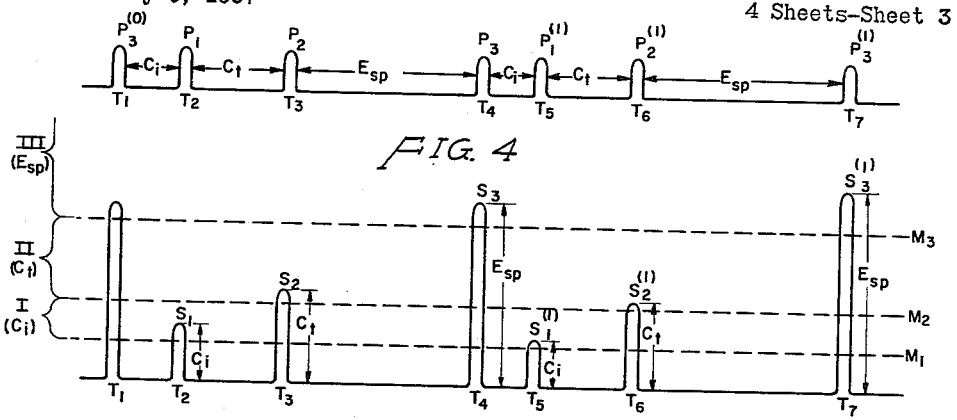
FIG. 4
FIG. 5
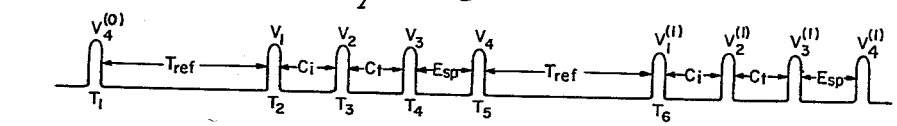
FIG. 7
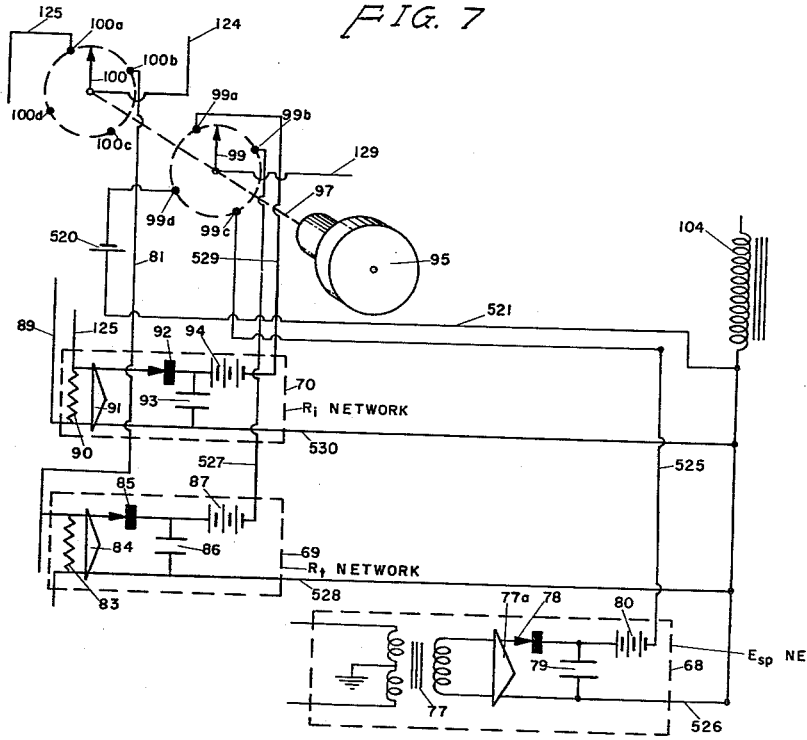
FIG. 8
*Jan J. Arps*
INVENTOR.
BY *Dows, McDougall, Williams & Hersh*
Attorneys July 24, 1962  J. J. ARPS  3,046,474
BORE-HOLE LOGGING SYSTEM AND METHOD
Filed July 3, 1957  4 Sheets-Sheet 4

Jan J. Arps
INVENTOR.

BY Dours, McDougall
Williams & Nash
Attorneys

United States Patent Office 3,046,474
Patented July 24, 1962

3,046,474
BORE-HOLE LOGGING SYSTEM AND METHOD
Jan J. Arps, Dallas, Tex., assignor to Arps Corporation, Dallas, Tex., a corporation of Delaware
Filed July 3, 1957, Ser. No. 669,864
15 Claims. (Cl. 324—1)

This invention relates to a method and apparatus for producing at the surface of the earth a record or indication of variations in structure existing in subsurface strata, and is particularly applicable to the logging of deep wells, such as oil wells. The method and apparatus herein described may be used to indicate and record at the surface the values of such bore-hole conditions as self-potential, temperature, pressure, radioactivity, deviation of the bore hole from the vertical, and bore-hole direction.

More particularly, this invention relates to signalling systems for use in bore holes and the like, and has particular application to systems for determining properties or characteristics of earth formations in a well while such well is being drilled.

Various systems have been suggested in the past for logging a well while drilling is actually in progress, by generating at the bottom of the bore hole coded electromagnetic impulses, representing the value of a particular physical condition at the bottom of the hole or of a particular characteristic of the formation being penetrated. Such electromagnetic impulses travel through the earth in all directions, and the prior-art systems have attempted in various ways to detect such impulses at the surface by means of electrodes located near the top of the bore hole. These attempts have not been successful. Such impulses are very rapidly attenuated in traveling through the earth, and they tend to be masked or overridden by subterranean electric impulses analogous to "noise."

Such "noise" impulses in the earth are sometimes produced by power installations or power lines. The main source of such noise impulses, however, is natural current flowing through the earth. Such natural currents, known as telluric currents, may be localized in the vicinity of ore bodies or buried metals, or they may cover exceedingly large areas. They vary widely in both amplitude and frequency. Generally the period of pulsation is rather long, ranging from a few seconds to a few minutes.

An important object of this invention is to detect at the earth's surface electromagnetic signals emanating from the bottom of a bore hole and to distinguish such signals successfully from the "noise" background caused by telluric currents.

Another object of the present invention is to provide an improved method and apparatus for transmitting information from the bottom of the bore hole to the earth's surface while the drilling is in progress.

Still another object of this invention is to provide a system for transmitting and receiving electrical current impulses from the bottom of a bore hole during the drilling operation in which the masking effect of telluric currents is substantially eliminated.

Further objects and advantages of the invention will appear from the following detailed disclosure of a preferred embodiment of the invention.

In the appended drawing:

FIG. 1a shows a modified fragment of FIG. 1.

FIG. 3 represents diagrammatically a voltage picked up at the earth's surface and representing telluric current.

FIGS. 3a and 3b show diagrammatically two forms of useful impulses detected at the earth's surface, superimposed on a voltage produced by telluric current, the effects of which it is desired to eliminate.

FIG. 4 shows a time pattern of current impulses produced by means of the subsurface equipment of FIG. 2.

FIG. 5 shows pulses derived from those illustrated in FIG. 4, the pulses in FIG. 5 having magnitudes representing the time intervals separating the pulses of FIG. .4

FIG. 7 shows a time pattern of current impulses in which a reference time interval is used for pulse identification.

FIG. 8 shows a modified fragment of the subsurface equipment of FIG. 2 that is especially adapted to produce impulses of the type shown in FIG. 7.

FIG. 9b shows diagrammatically a signal-discriminating network used in the arrangement of FIG. 9a.

Figure 1:
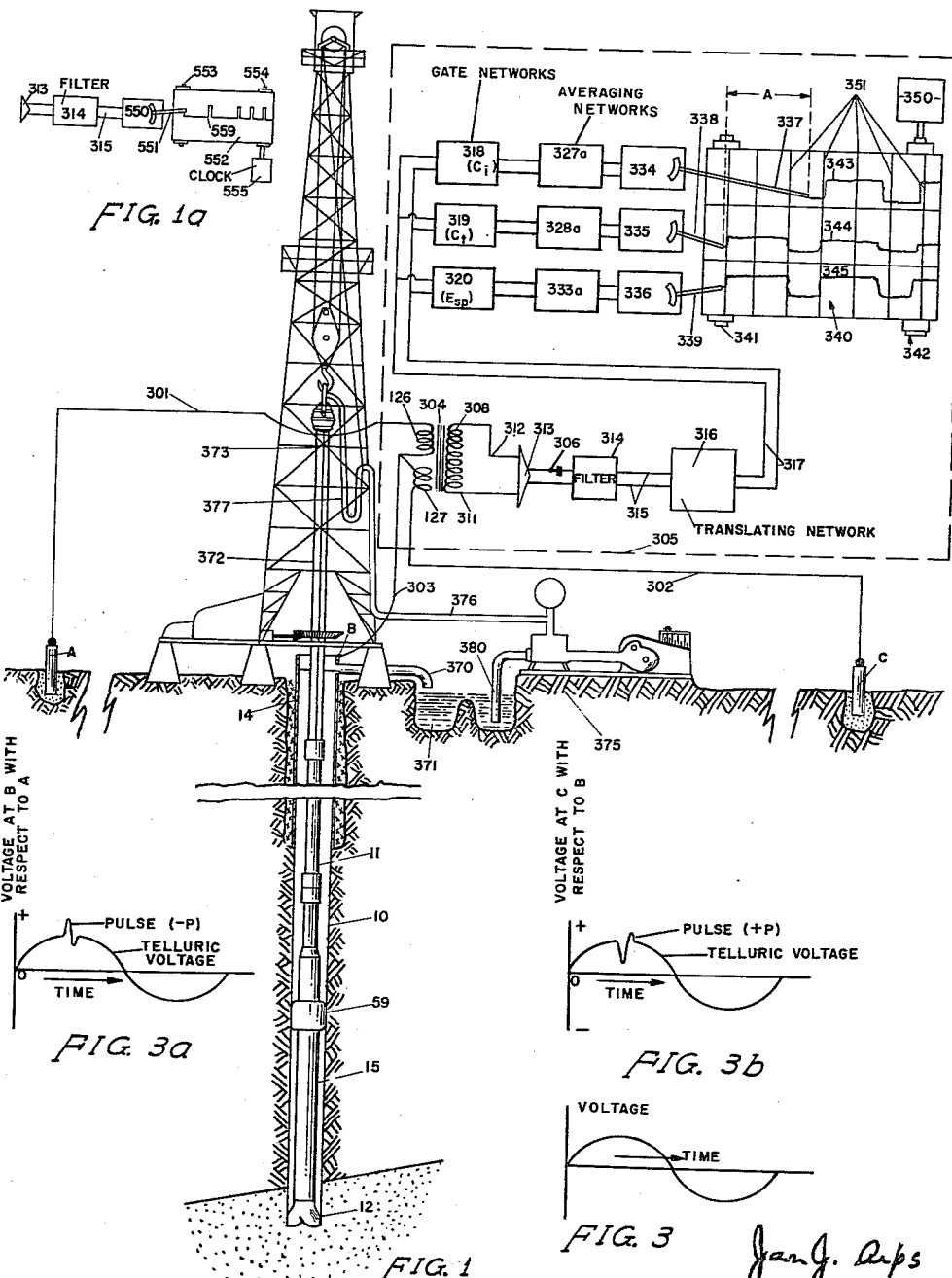
FIGURE 1 is a cross-sectional view of the subsurface and surface equipment for producing a visual record representing the variations of the resistivity of formation before invasion by mud filtrate, of the resistivity after such invasion and of the self-potential at the bottom of a bore hole.

Referring now to FIG. 1, I show a deep well or bore hole 10, penetrating various formations beneath the surface of the earth. A drill string 11 carrying at the lower end thereof a drill bit 12 is lowered into the well. At the surface the drill string is supported by standard apparatus and is rotated by a rotary table. All this equipment is standard equipment normally used in rotary drilling. Conventionally the uppermost part of this well has been cased with a section of casing 14. It is assumed in the following discussion that at least the major part and preferably all of the well is filled with a conductive fluid such as drilling mud.

Figure 2:
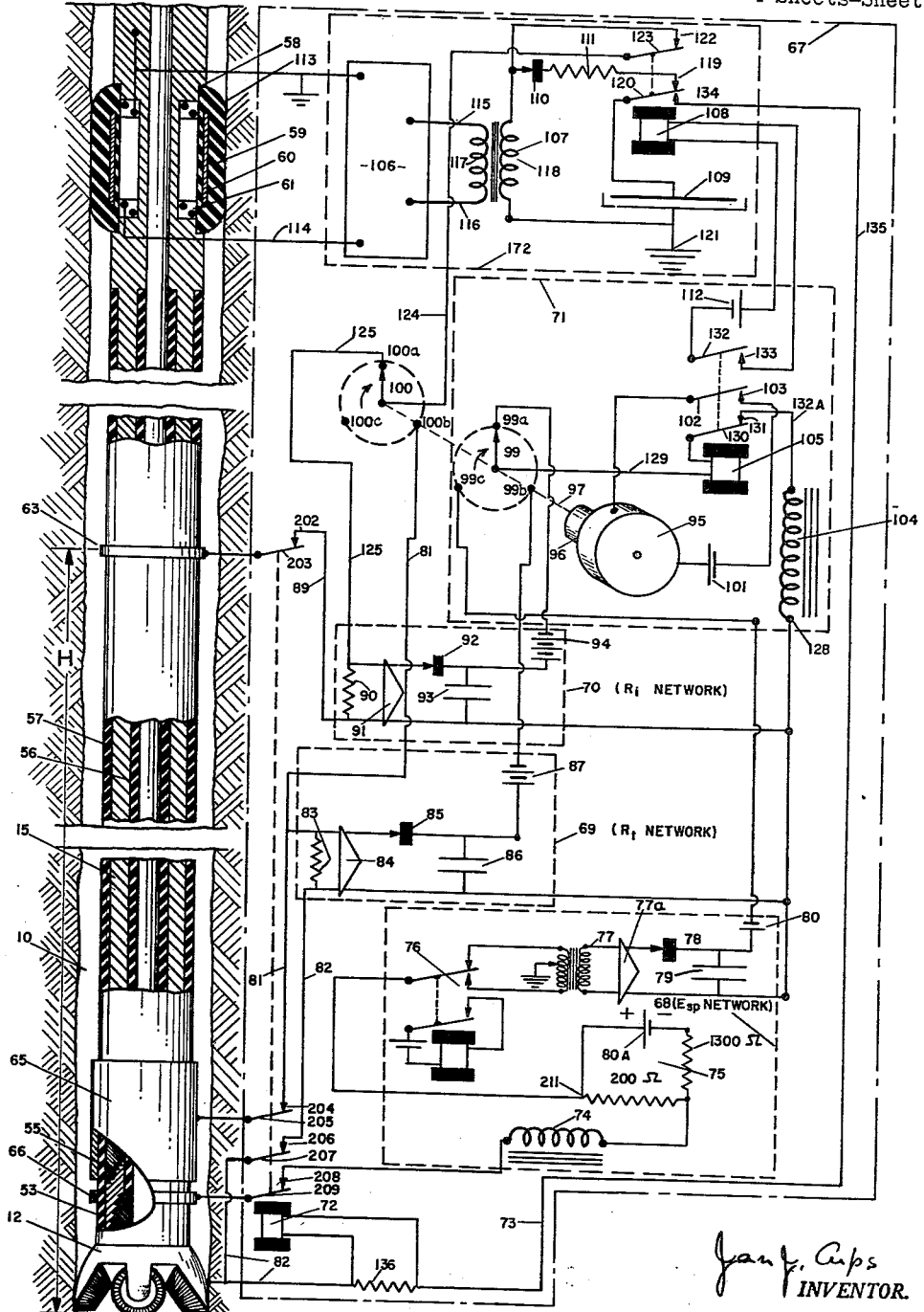
FIG. 2 is a vertical cross-sectional view of the subsurface equipment.

The lower portion of the drilling string conventionally consists of a few or several lengths of drill collars, i.e., of pipe whose diameter and wall thickness are greater than those of the drill pipe above. Their purpose is to concentrate more weight and to add stiffness to the string at the vicinity of the bit. The lowermost drill collar, designated by the numeral 15, is shown in FIGS. 1 and 2. A section of the wall of that drill collar has been hollowed out. A large part of the well-logging apparatus about to be described is located therein.

Referring now to FIG. 2, drill bit 12 is depicted in drilling position at the lower end of bore hole 10, connected to a short sub 53, which is in turn supported from drill collar 15 by a threaded, insulated connector joint 55. Sub 53 and drill collar 15 are of somewhat special configurations, as indicated or for reasons hereinafter made apparent. Also, the generally cylindrical interior and exterior surfaces of drill collar 15 and the sub 53 are insulated electrically from the drilling mud by interior and exterior insulating jackets 56 and 57.

The jackets are preferably firmly secured to the drill collar and sub by suitable bonding means and procedure. The sub and collar are provided with internal passages for accommodating the downward flow of drilling mud, and drill collar 15 is provided with enlargements in its bore for accommodation of an apparatus case (not shown), and recesses and passages for the accommodation of insulated wires, as is more particularly described and illustrated in my copending application for U.S. Letters Patent No. 431,734, filed May 24, 1954, to which reference may be made for additional details.

The drill collar is further provided with a peripheral recess 58 of sufficient longitudinal extent to accommodate therein the inner-bearing portion of an externally corrugated or ribbed stabilizer unit 59. The stabilizer may be constructed principally of rubber or other tough nonmagnetic material, and may be provided with longitudinally extending grooves and ribs as indicated in section in FIG. 2.

The ribs are adapted to engage the bore-hole wall and slowly slip downwardly therealong as drilling proceeds, and the grooves permit upward flow of the chip-carrying drilling fluid past the stabilizer in the bore-hole annulus.

Embedded in the interior portion of stabilizer 59 are magnetic field modifying elements 60, preferably of soft iron and of suitable cross-sectional configuration such as that indicated in FIG. 2.

The recessed portion of drill collar 15, covered by the stabilizer, is provided with a circumferential series of longitudinally extending interconnected grooves and intervening lands. These lands and grooves may have wrapped therearound insulated conductor means 61, such as one or more insulated electrical conductors in a manner well known in the electrical generator art.

The elements just described constitute a stabilizer-type generator, more particularly described and illustrated in my copending application for U.S. Letters Patent Serial No. 573,704, filed March 26, 1956, to which reference may be made for additional details.

The drill collar unit 15 is also provided with a cylindrical electrode 63, disposed circumferentially around the outer insulating jacket 57 at a substantial distance above rotary bit 12. The distance from the electrode 63 to the drill bit 12 is designated as H.

The drill collar 15 is also provided with a cylindrical metallic electrode 65 a short distance above the rotary bit 12. This electrode is insulated from the bit and sub and from the drill collar. The purpose of this electrode is to function as a guard electrode and to force the current issuing from the bit 12 in a preponderantly downward direction.

Another insulated ring electrode 66 is secured between this guard electrode and the bit. The purpose of this electrode, which is preferably made of a nonpolarizing material such as gold, lead, or carbon, is to measure the natural potential existing in the bore hole without interference from polarization effects.

Various leads to and from the aforementioned electrical apparatus are connected to an instrumentation-containing case (not shown) which is located in the drill collar 15 and is shown diagrammatically within the frame 67 of FIG. 2.

Disposed within this intrumentation case are a self-potential measuring network 68, a network 69 for the measurement of the true resistivity at the bit, a network 70 for the measurement of the invaded zone resistivity, a pulse timing device 71, and a voltage-regulating means and power supply 172.

The self-potential measuring network 68 is connected to electrode ring 66 and is activated only when relay 72 is in the de-energized position, as shown in FIG. 2. This self-potential measuring network comprises a smoothing coil 74 to eliminate any spurious alternating currents, a bias voltage arrangement 75 to convert the self-potential into a voltage which is always positive with respect to ground, a vibrator-type interrupter 76, a transformer 77, an amplifier 77a, a rectifier 78, a condenser 79, and a bias voltage battery 80, the operation of which will be explained in more detail hereafter.

The true resistivity measuring network 69 is connected through leads 81 and 82 to the lower guard electrode 65 and the insulated rotary bit 12, respectively. It consists of a low resistance shunt 83, an amplifier 84, a rectifier 85, a condenser 86, and a bias voltage battery 87. The operation of this circuit will also be explained in more detail hereafter.

The invaded zone resistivity measuring network 70 is connected through leads 89 and 125 to measuring electrode 63 and contact 100a, respectively. It further consists of a low resistance shunt 90, an amplifier 91, a rectifier 92, a condenser 93, and a bias voltage battery 94. The operation of network 70 will be explained in detail hereafter.

Pulse timing device 71 is activated by a rotary relay motor 95, such as are available under the trade name "Ledex," connected to a gear box 96 which drives a shaft 97 to which are attached wiper arms 99 and 100. The construction of this arrangement is such that upon each electrical impulse supplied to the rotary relay by the battery 101 and contacts 102 and 103, the shaft 97 rotates through a 120-degree arc, thereby causing wiper arm 99 to contact successively contacts 99a, 99b, and 99c while at the same time wiper arm 100 contacts successively contact points 100a and 100b and 100c. This pulse timing device is further provided with a saturable reactor 104 and a multiple relay 105, the operation of which will be explained in more detail hereafter.

Power supply unit 172, which is also enclosed in the central instrumentation housing, consists of voltage regulator 106, transformer 107, double relay 108, large capacity tantalum condenser 109, rectifier 110, and resistance 111. Relay coil 108 is activated by battery 112.

The porous formations adjacent the drill hole 10 normally contain intersitial water, oil, or gas under pressure. The pressure exerted by the drilling fluid in the bore hole is maintained during a drilling operation at a value greater than the pressure in said porous formations, to prevent the bore hole from collapsing. Consequently, as the drilling progresses, the porous formations penetrated by the drill bit are continually and gradually invaded by filtrate from the drilling fluid, and the resistivity of the porous formations gradually changes as a result. This invasion, however, requires a finite time interval for completion. The formation freshly uncovered by the bit, such as the formation in the immediate neighborhood of the bit 12, is still uncontaminated, and the resistivity of this formation, as measured through bit 12, is the true resistivity $R_t$ of the formation.

On the other hand, the formation in the immediate neighborhood of the electrode 63, positioned at a distance H above the electrode 66, is sufficiently far above the bit to have been completely invaded by the mud filtrate during the time interval in which the bit progressed from the level of the electrode 63 to the level shown in FIG. 2. I designate by the symbol $R_i$ the resistivity of this invaded formation.

I designate by the symbol $E_{sp}$ the spontaneous potential of the formation measured in the immediate neighborhood of the drill bit.

The network 70 for the measurement of the invaded zone resistivity, designated as the $R_i$ network, is provided with a condenser 93 and is adapted to charge this condenser to a voltage which is proportional to the conductivity $C_i$ of the invaded zone. The conductivity $C_i$ is the reciprocal of the resistivity; i.e., $C_i = 1/R_i$. The network 69 for the measurement of the true formation resistivity at the bit, designated as the $R_t$ network, is provided with condenser 86 and is adapted to charge this condenser to a voltage that is proportional to the true conductivity $C_t$ at the bit. The conductivity $C_t$ is the reciprocal of the true resistivity; i.e., $C_t = 1/R_t$.

The network 68 for the measurement of the self-potential, designated as the $E_{sp}$ network, is provided with a condenser 79 and is adapted to charge this condenser to a voltage representing the value $E_{sp}$.

The operation of this down-the-hole logging arrangement is as follows: Stabilizer-type generator 59 generates an alternating current whenever the drill pipe is rotated during the process of rotary drilling, which current passes to voltage regulator 106 through leads 113 and 114.

This voltage regulator 106 is of a design well known in the art, which keeps the output voltage supplied through leads 115 and 116 to the primary winding 117 of transformer 107 constant. The alternating voltage appearing across the terminals of secondary winding 118 is therefore also constant. Part of this current from the secondary winding 118 of transformer 107 is rectified through rectifier 110 and passed through resistor 111, relay contact points 119 and 120 to large capacity tantalum condenser 109. The other terminal of condenser 109 is connected to the secondary winding 118 of transformer 107 and is grounded at 121 to the drill string above the drill collar 15 which is of substantial length. This large capacity tantalum condenser 109 may be inside the central circuit housing or it may be disposed around the central bore in the drill collar body as a number of long cylindrical inserts parallel to the axis and connected in parallel. A very large capacity of the order of a substantial fraction of a farad can thus be obtained. Whenever contact points 119 and 120 are closed, condenser 109 is charged from transformer 107, via rectifier 110.

Another portion of the alternating current issuing from the secondary winding 118 of transformer 107 passes through contact points 122 and 123 of double relay 108 through lead 124 to contact wiper 100.

Whenever contacts 122 and 123 are in closed position, and arm 100 contacts point 100a, as shown in FIG. 2, this constant voltage alternating current is passed from wiper contact point 100a through lead 125 to low resistance member 90, lead 89 and relay contact points 202 and 203, to electrode 63 and thence through the formations to the "ground" connection at the upper end of drill collar 15.

The magnitude of the voltage across low resistance member 90 is proportional to the current passing through it, and such voltage is therefore representative of the conductivity of the invaded formation opposite electrode 63. Since the frequency of the alternating current used is low, the impedance of the formation actually measured is for all practical purposes equal to the resistance.

The alternating voltage appearing across the terminals of resistance 90 may be amplified through amplifier 91, rectified through rectifier 92 and applied to terminal 128 of the saturable reactor 104 and contact point 99a. Suitable bias voltage is provided by battery 94. The purpose of condenser 93 is to smooth out the voltage delivered to 128 and 99a.

Figure 6:
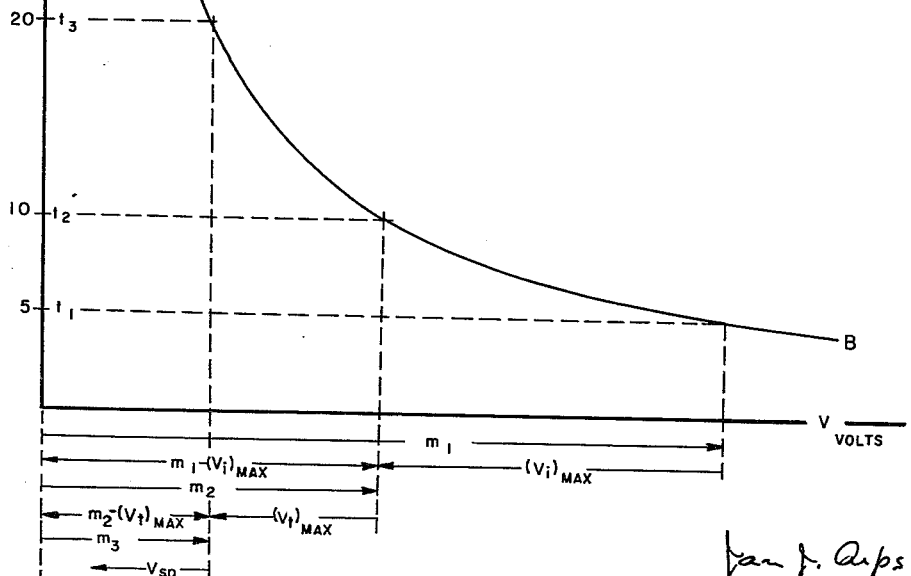
FIG. 6 shows the relationship between the signal-time intervals and the impressed voltages on the saturable reactor 104 of FIG. 2.

Through wiper arm 99, lead 129, relay solenoid 105, contact points 130 and 131, and lead 132A, the circuit through the saturable reactor 104 is completed. The operation of this timing circuit utilizing a saturable reactor is as follows: With the measuring voltage from the $R_i$ network applied to the terminals of the reactor 104, the current through the entire system will rise gradually because of the large inductance of this reactor. When saturation is reached, this inductance suddenly drops to substantially a zero value. The current then rises very sharply, which causes activation of triple relay 105. This, in turn, breaks the reactor circuit, because contact points 130 and 131 are separated. At the same time contact points 102 and 103 are closed, thereby causing motor 95 to turn shaft 97 and cause wiper arms 99 and 100 to turn to contact points 99b and 100b. At the same time contact points 132 and 133 are closed, thereby applying the voltage of battery 112 to relay 108. Activation of relay 108 will then cause the voltage of large capacity condenser 109 to pass through contact point 120 and 134 and leads 135, 73, low resistance shunt 136, and lead 82, to rotary bit 12, and from there to discharge through the formation, back to the grounded portion of the drill string above the insulated part of drill collar 15, thus emitting an electric signal. The time between the application of voltage to a saturable reactor and the time saturation is reached is essentially inversely proportional to the magnitude of the applied voltage. The time intervals between closings of relay 105 are therefore also inversely proportional to the impressed voltages. It is apparent that this impressed voltage is equal to the algebraic sum of two voltages, i.e., the voltage $V_i$ across the condenser 93, which indicates the value $C_i$ and the voltage $m_1$ of the neagtive bias battery 94. The constant voltage $m_1$ of negative bias battery 94 has been so chosen that it will exceed the maximum possible voltage $(V_i)_{max}$ by a predetermined value $m_1-(V_i)_{max}$. Since the bias battery 94 is connected in opposition to the polarity of the voltage $V_i$ across condenser 93, the impressed voltage on reactor 104 will range between $m_1(V_i=0)$ and $m_1-(V_i)_{max}$. The curve AB of FIG. 6 represents schematically the relationship between the voltage (V) impressed on saturable reactor 104 and the time intervals $t$ between closings of relay 105. The range of these time intervals, when measurements of the value $C_i$ are transmitted, is therefore between $t_1$ and $t_2$. These time intervals may be, for instance, 5 and 10 seconds, respectively, with the lower limit $t_1=5$ seconds representing $V_i$ and therefore $C_i$ equal to zero and the upper limit $t_2=10$ seconds representing $(V_i)_{max}$ and therefore the maximum possible value of $C_i$.

The relay 105 is actuated by very short current pulses passing through the saturable reactor 104 and the instants of occurrence of these pulses are designated in FIG. 4 as $T_1$, $T_2$, $T_3$, $T_4$, etc. At the instant $T_1$, the wipers 99 and 100 move from the contacts 99c and 100c to the contacts 99a and 100a, respectively, thus closing the circuit that connects the input terminals of the $R_i$ network to the electrode 63 and the output of the $R_i$ network to the reactor 104. This charges the condenser 93 to a voltage $V_i$ representing $C_i$. The time constant of the charging circuit is chosen so as to make the charging time of the condenser 93 very small with respect to the time representing $C_i$. Under influence of the impressed voltage $(m_1-V_i)$, the current through the reactor 104 increases until the reactor 104 is saturated. When the saturation is reached, the current then rises very sharply which causes the activation of the relay 105 which occurs at the instant $T_2$. Thus, the time interval between the instants $T_1$ and $T_2$ represents the measurement $C_i$.

Each time relay 105 closes, which occurs at suitable instants designated as $T_1$, $T_2$, $T_3$, $T_4$, etc., the condenser 109 is discharged through bit 12. The entire system is designed in such a manner that very large electrical pulses are thus released into the earth, strong enough to be detectable at the surface with the apparatus to be described presently.

Every time condenser 109 is discharged through bit 12 into the earth, a voltage appears across the terminals of shunt 136, which activates multiple relay 72 and breaks the circuits of the $R_i$ network (contacts 202—203), the $R_t$ network (contacts 204—205 and 206—207), and the $E_{sp}$ network (contacts 208—209), thus protecting the measuring networks from this large current discharge. As soon as the short-duration, heavy-current pulse has passed through the bit 12, the relay 72 is deactivated and the measuring circuits for $R_i$, $R_t$ and $E_{sp}$ are back in normal operation.

At the instant $T_2$, i.e., after completion of the current pulse signalling the end of the time period measuring $C_i$, wiper arms 100 and 99 are in contact with contacts 100b and 99b. The alternating current output from the secondary winding 118 of transformer 107 now passes through contacts 122 and 123, lead 124, wiper arm 100, contact 100b, lead 81 and contact points 204 and 205 to lower guard electrode 65, and also to bit 12 through shunt 83, lead 82, and contact points 206—207. The current flow through bit 12 and hence through the formations to "ground" passes through shunt 83. The voltage across shunt 83 is therefore proportional to the magnitude of that current, and such voltage is therefore representative of the conductivity $C_t$, or reciprocal of the true resistivity $R_t$, of the uninvaded formation below rotary bit 12. (The purpose of guard electrode 65 is to confine the current issuing from bit 12 into a predominantly downward path, thereby providing a more accurate measurement of the formation conductivity or resistvity at the bottom of the bore hole.)

The alternating voltage appearing at the terminals of shunt 83 is amplified through amplifier 84, rectified by rectifier 85, and applied to the terminal 128 of the saturable reactor 104 via contact point 99b and arm 99. This voltage I shall call "$V_t$." A suitable negative bias voltage $m_2$ is provided by battery 87. Condenser 86 smooths out the voltage $V_t$ derived from rectifier 85.

The circuit through saturable reactor 104 is now completed, via arm 99, lead 129, solenoid 105, contact points 130 and 131, and lead 132A. The operation of the saturable reactor as explained heretofore causes activation of relay 105 after an interval of time which is inversely proportional to the voltage impressed on saturable reactor 104.

The voltage now impressed on saturable reactor 104 is the algebraic sum of the voltage $V_t$ across condenser 86, which indicates the value $C_t$, and the voltage $m_2$ of negative bias battery 87. The constant voltage $m_2$ of negative bias battery 87 has been so chosen that it will equal $m_1-(V_i)_{max.}$, while the parameters of the $R_t$ network are designed in such a way that the difference between $m_2$ and the maximum possible voltage $(V_t)_{max.}$ will never be less than the value $m_2-(V_t)_{max.}$, shown in FIG. 6, which corresponds to a time interval of the saturable reactor of $t_3$ seconds.

When measurements of the value $C_t$ are transmitted, therefore, the time intervals $t$ between closings of relay 105 will fall between $t_2$ and $t_3$. These time intervals may be, for instance, 10 and 20 seconds, respectively, with the lower limit $t_2=10$ seconds, representing the limiting case when $V_t$ is equal to zero, and the upper limit, $t_3=20$ seconds, representing $(V_t)_{max.}$.

As shown in FIG. 4, the time $T_3$ designates the end of the time interval representing the value $C_t$. At the instant $T_3$ the multiple relay 105 is activated, thus breaking the reactor circuit, because contacts 130 and 131 are separated. At the same time contact points 102 and 103 are closed, thereby causing motor 95 to turn shaft 97 and cause wiper arms 99 and 100 to turn to contact points 99c and 100c. At the same time contact points 132 and 133 are closed, thereby applying the voltage of battery 112 to relay 108, thus releasing another burst of current from condenser 109 into the formation as explained before.

With wiper arms 99 and 100 contacting contacts 99c and 100c, the $E_{sp}$ measuring interval is started. The $E_{sp}$, or self-potential, is the natural electrical potential existing in the bore hole among other things as a result of the difference in salinity between the bore-hole mud and the formation water. To avoid polarization effects a pick-up electrode 66 is used, preferably constructed of non-polarizable material, and insulated from the steel of the drill collar and the drill bit. During this interval wiper arm 100 rests on empty contact 100c, since no energization of the formation is required. The natural potential from electrode 66 is applied through smoothing coil 74 and bias network 75 to the vibrator-type network 76. The purpose of the bias voltage network 75 is to add to the natural potential and make the output voltage at terminal 211 positive with respect to ground. With battery 80A having an E.M.F. of 1.5 volts, and the two shunt resistors having resistance of 200 and 1,300 ohms, respectively, as indicated, the voltage across the terminals of the 200-ohm resistor will be of the order of 200 millivolts. Since the natural potential rarely ever exceeds 200 millivolts negative, this causes the voltage at terminal 211 to be positive at all times. The vibrator network 76 is well known in the art and translates the positive D.-C. potential from terminal 211 into a square wave applied to the primary winding of transformer 77.

The output of the secondary winding of transformer 77 is amplified in amplifier 77a and then applied to rectifier 78. Its output $V_{sp}$, after being smoothed by condenser 79, is applied to terminal 128 of saturable reactor 104 and contact point 99c. A negative bias battery 80 of voltage $m_3$ is provided to change the effective voltage applied to the saturable reactor 104 to $m_3-V_{sp}$.

This bias battery 80 is connected in opposition to the polarity of the voltage $V_{sp}$ across condenser 79 and its voltage $m_3$ has been so chosen that it will equal $$m_2-(V_t)_{max.}$$

The parameters of the SP network are designed in such a manner that the maximum possible voltage $(V_{sp})_{max.}$ will never exceed the voltage $m_3$ of bias battery 80. Therefore, as shown by the relationship between the impressed voltage and saturation time of the saturable reactor 104 in FIG. 6, the time intervals between closings of the relay 105, when measurements of the value $E_{sp}$ are submitted, will always be larger than $t_3$. This time interval $t_3$ may be, for instance, 20 seconds and would represent a value of $E_{sp}$ equal to zero. Time intervals larger than $t_3$ would therefore indicate correspondingly larger values of the natural potential voltage $E_{sp}$.

Operation of the saturable reactor is as described before and the time interval between the pulse signifying the end of the previous measuring period and the one designating the end of the $E_{sp}$ measuring period is a direct measurement of the natural potential existing in the bore hole near electrode 66. The cycle is then repeated and $C_i$, $C_t$, and $E_{sp}$ are measured again in that order. The design of the circuits and bias batteries is such that the time interval for each measurement is self-identifying. The $C_i$ measurement is always between five seconds and ten seconds, and $C_t$ measurement between ten seconds and twenty seconds, and the $E_{sp}$ measurement always in excess of twenty seconds. Thus, with only one kind of pulse, three different measurements are made continuously and the detection equipment at the surface can identify each measurement simply by the duration of the interval.

Now turning again to FIG. 4, I show therein the pulse pattern as it is transmitted to the surface with the downhole instrumentation of FIG. 2. This pattern consists of a succession of pulses designated as $P_3{}^{(0)}$, $P_1$, $P_2$, $P_3$, $P_1{}^{(1)}$, $P_2{}^{(1)}$, $P_3{}^{(1)}$, $P_1{}^{(2)}$, $P_2{}^{(2)}$, $P_3{}^{(2)}$, etc., that are aligned along the time axis at definite intervals one from the other. The interval separating the pulses $P_3{}^{(0)}$ and $P_1$ is larger than the above referred to value $t_1=5$ seconds and smaller than the above referred to value $t_2=10$ seconds and, consequently, the length $P_3{}^{(0)}P_1$ represents the value $C_i$. The interval separating the pulses $P_1$ and $P_2$ is larger than $t_2=10$ seconds and smaller than $t_3=20$ seconds and, consequently, the interval $P_1P_2$ represents the measurement $C_t$. The interval separating the pulses $P_2$ and $P_3$ is larger than 20 seconds and, consequently, represents the measurement $E_{sp}$. Similarly, in the succeeding cycle the interval $P_3P_1{}^{(1)}$ represents the next measurement of $C_i$; the interval $P_1{}^{(1)}P_2{}^{(1)}$ represents the next measurement of $C_t$ and the interval $P_2{}^{(1)}P_3{}^{(1)}$ represents the next measurement of $E_{sp}$. This procedure is repeated with subsequent pulses. Each group of pulses is spaced according to self-identifying time intervals, and the interval between any two pulses represents either the measurement $C_i$, $C_t$ or $E_{sp}$, depending on the magnitude of such time interval. In the example given, the interval represents $C_i$ if it is between 5 and 10 seconds, it represents $C_t$ if it is between 10 and 20 seconds, and it represents $E_{sp}$ if it is greater than 20 seconds.

As described, a succession of electromagnetic pulses, such as shown in FIG. 4, is emitted at the bottom of the drill string and travels upward to the earth's surface to be detected by means of the electrodes A, B, and C in FIG. 1. As stated previously, these signals suffer a considerable attenuation during their travel toward the earth's surface, and special arrangements are provided at the earth's surface in order to separate the signals from the telluric current background.

This has been achieved in this invention by a novel compensation method as illustrated in FIG. 1. Two non-polarizable electrodes A and C are placed in the ground diametrically away from and equidistant from the drilling well. A third electrode B located at the well may be attached to surface casing 14.

The leads 301, 302, and 303 from these ground electrodes A, C, and B are connected to the terminals and the center tap of the primary winding of transformer 304, as shown in the diagrammatic drawing of the surface detecting equipment.

When a telluric current wave, moving laterally through the earth, passes the set of surface electrodes, its potential will be picked up between B and A and between C and B. It is noted that the voltage between the electrodes B and A will be essentially identical to the voltage picked up between the electrodes C and B. The ordinate of FIG. 3 shows the magnitude of this varying voltage and the abscissa represents time. Assume now that a short electromagnetic pulse P emitted at the bottom of the bore hole by means of the subsurface instrument arrives at the earth's surface. This pulse P is superimposed upon the telluric current waves, and consequently we obtain between the electrodes B and A a voltage varying with time substantially as shown in FIG. 3a, and between the electrodes C and B a voltage varying with time substantially as shown in FIG. 3b. Because of the geometry of this arrangement, the arrival of the pulse P will simultaneously show itself as a positive voltage at C with respect to B and as a negative voltage at A with respect to B.

The primary winding of transformer 304 consists of two coils 126 and 127 which are wound in opposition as shown. The telluric current effect picked up by the electrodes BA and CB is therefore cancelled out and in the secondary winding 308 the effects of the pulse P are added together and amplified.

The output terminals 311 and 312 of the transformer 304 are applied through an amplifier 313 and rectifier 306 to an appropriate filter 314 which will pass relatively short pulses but which will not pass slow changes in potential. The output voltage from filter 314 is a succession of pulses as illustrated in FIG. 4.

The leads 315 are subsequently applied to a translating network 316, said network producing across its output leads 317 current impulses having magnitudes representing the time intervals between the input pulses. Networks of this type are well known in the art. A detailed description of one type of a translating network 316 is given in the U.S. Patent No. 2,755,431, issued July 17, 1956, to S. A. Scherbatskoy, and a schematic diagram of such network is shown in FIG. 2 of said patent wherein it is designated by the numeral 123.

Across the output terminals 317 of the translating network 316 a train of pulses $S_1$, $S_2$, $S_3$, etc., such as shown in FIG. 5, is produced, such pulses having magnitudes representing the time intervals separating the corresponding pulses $P_3^{(0)}$, $P_1$, $P_2$, $P_3$, etc., shown in FIG. 4. More specifically, the magnitude of the pulse $S_1$ is proportional to the time interval $T_1T_2$ between pulses $P_3^{(0)}$ and $P_1$ and represents, therefore, a measurement of $C_i$. Similarly, the magnitude of the pulse $S_2$ is proportional to $T_2T_3$ and represents, therefore, a measurement of $C_t$, while the pulse $S_3$ is proportional to $T_3T_4$ and represents a measurement of $E_{sp}$. FIG. 5 shows also horizontal lines $M_1$, $M_2$, and $M_3$ that are respectively distant from the base line by amounts corresponding to time intervals $t_1$, $t_2$, and $t_3$, said lines representing the above referred to threshold values. Thus the pulses $S_1$, $S_2$, etc. can be subdivided in three groups which are designated by Roman numerals I, II, and III.

Group I comprises pulses having their upper ends positioned between the lines $M_1$ and $M_2$, such as the pulses $S_1$, $S_1^{(1)}$, $S_1^{(2)}$. These pulses represent the successive values of the measurement of $C_i$.

Group II comprises pulses having their upper ends positioned between the lines $M_2$ and $M_3$, such as the pulses $S_2$, $S_2^{(1)}$, $S_2^{(2)}$, etc. These pulses represent the successive values of the measurement $C_t$.

Group III comprises pulses having upper ends positioned above the line $M_3$, such as pulses $S_3$, $S_3^{(1)}$, $S_3^{(2)}$, etc. These pulses represent the successive values of the measurement of $E_{sp}$.

The output pulses obtained across the leads 317 are subsequently applied to three gate networks, 318, 319, and 320, each of said networks being characterized by an appropriate upper threshold and lower threshold and adapted to transmit only those impulses which are within said thresholds.

The gate network 318 is characterized by thresholds $M_1$ and $M_2$ and is adapted to transmit to its output terminals 325 only those impulses that are smaller than $M_2$ and larger than $M_1$. Therefore, this gate network transmits only the impulses of the group I.

The gate network 319 is characterized by thresholds $M_2$ and $M_3$ and is adapted to transmit to its output terminals only those impulses that are larger than $M_2$ and smaller than $M_3$. Therefore, this gate transmits only the impulses of the group II.

The gate network 320 is characterized by a threshold $M_3$ and is adapted to transmit to its output terminals only those impulses that are larger than $M_3$. Therefore, the gate network transmits only the impulses of the group III.

The output signals from the gate networks 318, 319, and 320 are respectively fed to averaging networks 327a, 328a, and 333a, and thence to suitable metering systems or galvanometers 334, 335, and 336, respectively. The hands 337, 338, and 339 of metering apparatus or galvanometers 334, 335, and 336, respectively, carry pens which bear upon a strip of graph or chart paper 340 arranged to be moved between rollers 341 and 342 for the purpose of tracing three curves designated as 343, 344, and 345. The rollers 342 are driven in a definite relation to the downward motion of the drill bit and for this purpose there is provided a suitable depth measuring mechanism designated by the block 350 which is of conventional design and is moved by the depth measurements of the drill hole. The depth measuring device 350 may be of the design more fully described in my Patents 2,524,031 and 2,700,897, or my copending application 269,568.

The galvanometers or metering mechanisms diagrammatically shown as 334, 335, 336 may include the usual and conventional circuits for variation of their sensitivity and also, if desired, suitable amplification means. The resultant motions of the hands 337, 338, and 339 of the meters 334, 335, and 336, respectively, cause curves 343, 344, and 345, respectively, to be drawn upon the moving chart 340, the varying amplitude of each curve constituting a visual indication or log, representing the variation of a given measured quantity with respect to depth.

More particularly, the curve 343 represents the variation of a function of the measurement of the conductivity of the invaded formation $C_i$ with depth. This function is inversely proportional to the difference between $m_1$ and voltage $V_i$ and therefore only approximately linear with respect to the value of $C_i$. For the purpose of this disclosure it will be assumed that an appropriate scale is provided on the graph to convert the reading to the exact numerical value of $C_i$ although suitable transducers, well known in the art, can be provided to convert this function directly into the value of $C_i$ or its inverse, $R_i$, the resistivity of the invaded formation.

The curve 344 represents a function of the conductivity of the uninvaded formation $C_t$ with respect to depth, which function is inversely proportional to the difference between $m_2$ and the voltage $V_t$, and can either be translated by means of an appropriate scale into the numerical value of $C_t$ or by means of transducers as referred to above.

The curve 345 represents a function of the self-potential of the formation $E_{sp}$ with respect to depth, which function is inversely proportional to the difference between $m_3$ and the voltage $E_{sp}$, and can either be translated by means of an appropriate scale into numerical values of $E_{sp}$ or by means of transducers, as referred to above.

The hands 338 and 339 are of the same length; however, the hand 337 is longer than either of the hands 338 or 339 by an amount A, said amount A being directly related to distance H between the electrodes 63 and the bit 12. Thus it is directly related to the vertical distance separating the respective positions in the bore hole at which the conductivity before invasion $C_t$ and the conductivity after invasion $C_i$ are measured. Thus the curve representing $C_i$, as plotted on the paper 340, is suitably longitudinally displaced with respect to the log of $C_t$ so that the two logs have a common depth scale. Various depths are indicated on the record 340 by means of lines 351.

Thus I have provided a system for simultaneously plotting with respect to the same depth scale the measurements of $C_i$, $C_t$, and $E_{sp}$. Through suitable circuitry combined with the metering mechanisms 334 and 335, measurements of the resistivity of the invaded zone $R_i = 1/C_i$ and of $R_t = 1/C_t$ may be recorded instead, if desired. Suitable circuit modifications for that purpose will be obvious to readers skilled in the art.

It should be noted that in the arrangement of FIG. 4 the identification of the measurements of $C_i$, $C_t$, and $E_{sp}$ does not depend on shape of the pulses of $P_1$, $P_2$, etc. but only on their times of arrival. Furthermore, the time intervals separating these pulses are self-identifying; i.e., they can be directly correlated with the corresponding values $C_i$, $C_t$, and $E_{sp}$, since the time interval corresponding to each of said values varies within a predetermined and distinct range of magnitudes.

FIG. 7 shows a different pulse pattern which also has the advantage of being self-identifying although only one type of pulses is used. This pattern comprises a successive cycle of measurements comprising pulses $V_1^{(0)}$, $V_2^{(0)}$, $V_3^{(0)}$, $V_4^{(0)}$, then $V_1$, $V_2$, $V_3$, $V_4$, then $V_1^{(1)}$, $V_2^{(1)}$, $V_3^{(1)}$, $V_4^{(1)}$, etc. Each cycle comprises the three measurements $C_i$, $C_t$, $E_{sp}$ which always come in this order, i.e., the time interval between $V_1$ and $V_2$ represents $C_i$, the time interval between $V_2$ and $V_3$ represents $C_t$ and the time interval between $V_3$ and $V_4$ represents $E_{sp}$. These cycles are separated by reference time intervals $T_{ref}$. Thus $$V_4^{(0)} V_1 = V_4 V_1^{(1)} = T_{ref}$$

The characteristic feature of this pattern is the fact that the reference time interval is longer than any of the individual measurement intervals. Thus $T_{ref} > C_i$; $T_{ref} > C_t$; $T_{ref} > E_{sp}$. In accordance with this pattern the measurement intervals vary in accordance with the measurements performed. However, the magnitude of these time intervals is always confined with a certain predetermined range. Thus $0 < C_t < M$; $0 < C_i < M$; $0 < E_{sp} < M$. In these inequalities the value M represents the upper limit of the time intervals representing $C_i$, $C_t$, $E_{sp}$. This upper limit is known from experience in a given area and the reference time interval $T_{ref}$ is arranged by the design of the instrument to exceed said upper limit, i.e., $T_{ref} > M$. Therefore, by the inspection of the pattern of FIG. 7, one can readily distinguish the reference time intervals $T_{ref}$ since these are the only time intervals that exceed the upper limit M.

FIG. 8 shows an arrangement for transmitting a pulse pattern of the type shown in FIG. 7, characterized by the use of a reference time interval outside of the range of magnitudes of the measurement intervals representing $C_i$, $C_t$, and $E_{sp}$. The arrangement of FIG. 8 represents a modification of the corresponding portion of the subsurface equipment in FIG. 2. Therefore, the same elements in both figures are denoted by the same numerals and, furthermore, the remaining portion of the subsurface equipment that is not shown in FIG. 8 is the same as the one shown in FIG. 2.

In FIG. 8, the Ledex motor 95 is designed to rotate shaft 97 one-quarter turn with each activation. Wiper arms 99 and 100 are then made to contact four instead of three contact points in succession. In the arrangement of FIG. 2 the three contact points that are contacted in succession by the wiper arm 99 are 99a, 99b, 99c, and the corresponding contact points contacted by the wiper arm 100 are 100a, 100b, and 100c. On the other hand, in the arrangement of FIG. 8 the four contact points that cooperate in succession with the wiper arm 99 are 99a, 99b, 99c, and an additional contact point 99d; the four contact points that cooperate in succession with the wiper arm 100 are 100a, 100b, 100c, and an additional contact point 100d. The contact point 100d is entirely isolated in the same manner as the contact point 100c. However, the contact point 99d is connected to one terminal of a battery 520, the other terminal of said battery being connected through lead 521 to one terminal of the saturable reactor 104. The voltage of battery 520 determines the magnitude of the reference time interval $T_{ref}$, and this voltage should be small enough so as to have $T_{ref} > M$.

The voltages of bias batteries 80, 87, and 94 are chosen in such a manner that they exceed the maximum voltages of $V_i$, $V_t$, and $V_{sp}$—with which they are connected in opposition—by more than the magnitude of the voltage of battery 520, thus making the time intervals representing the measurements $C_i$, $C_t$, and $E_{sp}$ always less than $T_{ref}$.

The operation of this arrangement is very similar to the one shown in FIG. 2. The system has been designed to provide four voltages as follows:

(1) The voltage of bias battery 80 minus the voltage across the terminals of the condenser 79, which is the output voltage of the $E_{sp}$ network 68. (This voltage is produced between the leads 525 and 526, as shown in FIG. 8.)

(2) The voltage of bias battery 87 minus the voltage across the terminals of the condenser 86, which is the output voltage of the $R_t$ network 69. (This voltage is produced between the leads 527 and 528, as shown in FIG. 8.)

(3) The voltage of bias battery 94 minus the voltage across the terminals of the condenser 93, which is the output voltage of the $R_i$ network 70. (This voltage is produced between the leads 529 and 530.)

(4) The voltage generated by the battery 520.

The above four voltages are continually and recurrently inserted into the circuit comprising the saturable reactor 104 due to the rotation of the shaft 97 in the following manner: When the wiper arm 99 contacts the point 99d at the instant $T_1$, the voltage from battery 520 starts energizing the saturable reactor 104 and thus produces a sudden intense current pulse at the instant $T_2$ after a time interval $T_{ref}$ which is determined by the voltage of battery 520. At the same instant $T_2$, the Ledex motor 95 effects an angular displacement of one-quarter of a revolution in a manner explained herein above in connection with FIG. 2 and moves the wipers 99 and 100 to the contacts 99a and 100a, respectively. Thereupon the voltage derived from the leads 529, 530 is applied to the saturable reactor 104 and produces a sudden intense current pulse through the saturable reactor 104 at an instant $T_3$, the time interval between the instants $T_2$ and $T_3$ representing the measurement $C_i$. At the instant $T_3$, the Ledex motor 95 effects the next angular displacement and moves the wipers 99 and 100 to the contacts 99b and 100b, respectively. At this instant the voltage derived from the leads 527, 528 is applied to the saturable reactor 104 and produces, at a later time $T_4$ a sudden intense current pulse through the saturable reactor 104, the time interval between $T_3$ and $T_4$ representing the measurement $C_t$. At the instant $T_4$ the Ledex motor 95 effects the next angular displacement and moves the wipers 99 and 100 to the contacts 99c and 100c, respectively. At this instant the voltage derived from the leads 525, 526 is applied to the saturable reactor 104 and produces at time $T_5$ a sudden intense current pulse through the saturable reactor 104, the time interval between the instants $T_4$ and $T_5$ representing the measurement $E_{sp}$. At the instant $T_5$ the Ledex motor 95 effects the next angular displacement and moves the wipers 99 and 100 back to the contacts 99d and 100d, thus beginning a new cycle of the measurements in the manner just explained.

The pulse pattern such as the one shown in FIG. 7, obtained by means of the subsurface equipment of FIG. 8, is collected by means of the electrodes A, B, and C in FIG. 1 and produced across the output terminals 315 of the filter 314 in the manner already explained in connection with FIG. 1.

FIG. 1a shows a means to obtain a permanent record of such a pattern. The output leads 315 are applied to a suitable metering system 550 provided with a hand 551 which carries a pen that bears upon a chart 552. The chart is moved by rollers 553, 554, that are driven by a clock mechanism 555. The resultant motion of the hand 551 causes a curve 559 to be drawn on the chart, said curve representing a pattern such as shown in FIG. 7.

Figure 9B:
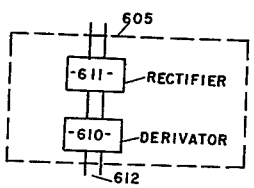
Figure 9A:
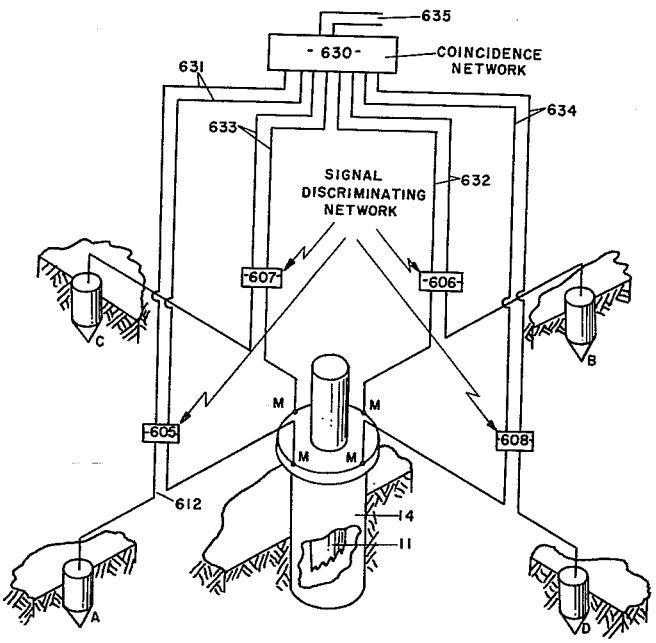
FIG. 9a shows schematically an arrangement of apparatus specifically designed to differentiate useful signal pulses from the telluric-current background noise.

Referring now to the surface equipment shown in FIGS. 9a and 9b, I show therein an alternative means of detecting at the surface the electromagnetic signaling pulses transmitted by the subsurface equipment. In the FIGS. 9a and 9b apparatus, the pulses transmitted to the top of the drill hole are detected by means of a central terminal M electrically connected to the surface casing 14 and four potential electrodes A, B, C, D, which are positioned on four radial lines extending from the bore hole at an angle of 90 degrees from each other. These electrodes are designated as electrodes A and M, making up one pair, electrodes M and B, making up a second pair, electrodes C and M constituting a third pair, and electrodes M and D constituting the fourth pair. Electrodes of each pair are spaced apart from each other by a substantial distance of at least several hundred feet. Each of the potential electrodes may be of a conventional nonpolarizable type and is embedded in the surface of the earth or buried somewhat beneath, so as to secure good ground contact. The voltages derived from said four electrode pairs are individually applied to signal discriminating networks designated as 605, 606, 607, and 608. Each of said networks is adapted to attenuate the telluric currents and thus to transmit to its output the pulses produced by the means of the subsurface equipment of FIG. 2 and carrying useful information. Each of the discriminating networks may be a high pass filter arranged to attenuate the lower frequencies characterizing the telluric currenct. An alternate embodiment for each of the discriminating networks is shown in FIG. 9b, which comprises a derivator 610 connected through leads 612 to suitable ground electrodes, and a rectifier 611 connected to the output of the derivator. The derivator 610 is of a type well known in the art and is adapted to produce across the output terminals a voltage representing the derivative of its input voltage. Therefore, the derivator tends to accentuate the rapid variations caused by the useful impulses and to depress the slow variations due to the telluric current. The voltage from the derivator is applied to the rectifier 611 and produces across the output terminals of said rectifier a voltage in which the telluric currents are substantially eliminated. The outputs of the signal discriminating networks 605, 606, 607, and 608 are in turn connected to the input of a quadruple coincidence network 630. The coincidence network is of the type well known in the art and is adapted to produce across its output leads 635 an electrical pulse whenever four pulses applied to the four input terminals of the coincidence network occur in coincidence, said input terminals being designated as 631, 632, 633, and 634. The coincidence networks are widely used in detection of nuclear particles or nuclear radiations. For a description of some types of coincidence networks see, for instance, Alex E. S. Green, Nuclear Physics, McGraw-Hill Book Co., 1955, pages 139–150, and the references 6 and 24–27 on page 172.

The coincidence network will respond only to the useful signals received from the subsurface equipment and will not respond to the parasitic telluric currents. The desired signals will travel from the bottom of the bore hole to the symmetrically arranged electrodes M, A, B, C, and D in the same elapsed time and will reach the electrodes simultaneously with respect to the axis of the bore hole, i.e., the voltages MA, MB, MC, and MD are all of the same polarity. Occasionally these voltage impulses may be superimposed upon telluric currents as shown in FIG. 3b. However, telluric currents picked up at the earth's surface will not normally produce voltages across terminals MA, MB, MC, and MD having time coincidence as to magnitude and phase, since the electrodes are not symmetrically disposed with respect to the sources of telluric currents. As a result, telluric currents fail to actuate the coincidence network. Further discrimination against telluric currents is provided by the networks 605, 606, 607, and 608, which are highpass filters designed to pass freely the signal pulses and to alternate the lower-frequency telluric currents.

The signals appearing on output leads 635, it will be understood, may be applied to translating network 316 of FIG. 1, the apparatus of FIGS. 9a and 9b being an alternative to the signal-pickup apparatus shown in FIG. 1.

While I have described herein several typical embodiments of my invention, these descriptions have been illustrative only. I desire that the scope of my invention be determined primarily by reference to the appended claims.

I claim:

1. A method of signaling from the bottom of a bore hole during drilling which comprises the steps of generating electrical energy locally in said bore hole, capacitively storing said energy, and then suddenly discharging said stored energy through the formations adjoining said bore hole between two spaced zones in said bore hole, radiating thereby a powerful electromagnetic pulse through such adjoining formations, repeating said aforementioned steps at controlled intervals responsively to the varying values of a physical condition existing in said bore hole to produce a train of such radiated pulses, and detecting the radiated pulses at the surface of the earth.

2. A method of logging the varying values of a borehole quantity while drilling which comprises the steps of generating electrical energy locally in said bore hole, capacitively storing said energy, and then suddenly discharging said stored energy through the formations adjoining said bore hole between two spaced zones in said bore hole, radiating thereby a powerful electromagnetic pulse through such formations, repeating said aforementioned steps at controlled intervals responsively to the varying values of a physical condition existing in said bore hole to produce a train of such radiated pulses, detecting the radiated pulses at the surface of the earth, and translating such detected pulses into a record of the successive values of such physical condition.

3. A method of signaling from the bottom of a bore hole during drilling which comprises the steps of generating electrical energy locally in said bore hole, capacitively storing said energy, and then suddenly discharging said stored energy through the formations adjoining said bore hole between spaced zones in said bore hole, radiating thereby a powerful electromagnetic pulse through such formations, measuring in said bore hole the varying values of two physical conditions existing therein and producing first and second distinct signals respectively corresponding to the varying values of such two conditions, repeating said generating, storing, and discharging steps at controlled intervals responsively successively to said first and second signals to produce a train of said radiated pulses at controlled intervals, the intervals produced responsively to said first signal lying within one predetermined range of duration magnitude and the intervals produced responsively to said second signals lying within a second predetermined range of duration magnitude which is distinct and non-overlapping with said first range, and detecting said radiated pulses to the surface of the earth.

4. A method of logging from the bottom of a bore hole during drilling which comprises the steps of generating electrical energy locally in said bore hole, capacitively storing said energy, and then suddenly discharging said stored energy through the formations adjoining said bore hole between spaced zones in said bore hole, radiating thereby a powerful electromagnetic pulse through such formations, measuring in said bore hole in varying values of two physical conditions existing therein and producing first and second distinct signals respectively corresponding to the varying values of such two conditions, repeating said generating, storing, and discharging steps at controlled intervals responsively successively to said first and second signals to produce a train of said radiated pulses at controlled intervals, the intervals produced responsively to said first signal lying within one predetermined range of duration magnitude and the intervals produced responsively to said second signals lying within a second predetermined range of duration magnitude which is distinct and nonoverlapping with said first range, detecting said radiated pulses at the surface of the earth, and translating such detected pulses in accordance with the intervals therebetween to produce simultaneous logs of the varying values of said two physical conditions.

5. Apparatus for signaling from the bottom of a bore hole while drilling, comprising a drill stem, an electric power generator in said drill stem for generating electrical energy, a large-capacitance condenser carried by said drill stem, circuit means for charging said condenser from said generator, means for discharging said condenser through the formations adjoining said bore hole between two spaced zones therein, thereby radiating into said formations a powerful electromagnetic pulse, sensing means for measuring the varying values of a physical condition existing in said bore hole and producing a signal indicative thereof, means operative responsively to said signal to control said discharging means and thereby to produce a train of said condenser discharges at intervals corresponding to the successive values of said signal, and means at the earth's surface for detecting the electromagnetic pulses resulting from such discharges and sensing the intervals therebetween.

6. Apparatus for signaling from the bottom of a bore hole while drilling, comprising a drill stem, an electric power generator in said drill stem for generating electrical energy, a large-capacitance condenser carried by said drill stem, circuit means for charging said condenser from said generator, first sensing means operative to measure the successive values of a first physical condition existing in said bore hole and to produce first signals indicative of the varying values of such first condition, second sensing means operative to measure the successive values of a second physical condition existing in said bore hole and to produce second signals indicative of the varying values of said second condition, means for discharging said condenser through the formations adjoining said bore hole between two spaced zones therein, thereby radiating into said formations a powerful electromagnetic pulse, control means for said discharging means operative responsively to said first and second signals to actuate said discharging means at controlled intervals, some of said controlled intervals being determined responsively to said first signals and others of said controlled intervals being determined responsively to said second signals, said control means having also means fixing the range of variation of the intervals determined by said first signals within predetermined limits and fixing the range of variation of the intervals determined by said second signals within other predetermined limits, said two ranges being distinct and non-overlapping, whereby a train of said electromagnetic pulses is radiated at controlled intervals into said surrounding formations, and means at the surface of the earth for detecting said radiated pulses and sensing the intervals therebetween.

7. Apparatus for logging from the bottom of a bore hole while drilling, comprising a drill stem, an electric power generator in said drill stem for generating electrical energy, a large-capacitance condenser carried by said drill stem, circuit means for charging said condenser from said generator, first sensing means operative to measure the successive values of a first physical condition existing in said bore hole and to produce first signals indicative of the varying values of such first condition, second sensing means operative to measure the successive values of a second physical condition existing in said bore hole and to produce second signals indicative of the varying values of said second condition, means for discharging said condenser through the formations adjoining said bore hole between two spaced zones therein, thereby radiating into said formations a powerful electromagnetic pulse, control means for said discharging means operative responsively to said first and second signals to actuate said discharging means at controlled intervals, some of said controlled intervals being determined responsively to said first signals and others of said controlled intervals being determined responsively to said second signals, said control means having also means fixing the range of variation of the intervals determined by said first signals within predetermined limits and fixing the range of variation of the intervals determined by said second signals within other predetermined limits, said two ranges being distinct and non-overlapping, whereby a train of said electromagnetic pulses is radiated at controlled intervals into said surrounding formations, means at the surface of the earth for detecting said radiated pulses and sensing the intervals therebetween, and means for translating said detected pulses in accordance with such intervals to produce simultaneous logs of the varying values of said two physical conditions.

8. Apparatus for logging from the bottom of a bore hole while drilling, comprising a drill stem, an electric power generator in said drill stem for generating electrical energy, a large-capacitance condenser carried by said drill stem, circuit means for charging said condenser from said generator, first sensing means operative to measure the successive values of a first physical condition existing in said bore hole and to produce first signals indicative of the varying values of such first condition, second sensing means operative to measure the successive values of a second physical condition existing in said bore hole and to produce second signals indicative of the varying values of said second condition, means for discharging said condenser through the formations adjoining said bore hole between two spaced zones therein, thereby radiating into said formations a powerful electromagnetic pulse, control means for said discharging means operative responsively to said first and second signals to actuate said discharging means at controlled intervals, some of said controlled intervals being determined responsively to said first signals and others of said controlled intervals being determined responsively to said second signals, said control means having also means fixing the range of variation of the intervals determined by said first signals within predetermined limits and fixing the range of variation of the intervals determined by said second signals within other predetermined limits, said two ranges being distinct and non-overlapping, whereby a train of said electromagnetic pulses is radiated at controlled intervals into said surrounding formations, means at the surface of the earth for detecting said radiated pulses and sensing the intervals therebetween, means for generating responsively to said detected pulses a train of electric impulses respectively having magnitudes corresponding to the intervals between successive detected pulses, and means for selecting and separately logging said electric impulses according to their respective magnitudes.

9. A method of signaling from the bottom of a bore hole which comprises measuring in said bore hole the varying values of two physical conditions existing therein, transmitting from said bore hole to the earth's surface a train of uniform signal pulses, and controlling the intervals between said pulses in accordance with the varying values of said physical conditions, the intervals between some of said pulses being controlled by and indicative of the value of one of said conditions and others of said intervals being controlled by and indicative of the values of said other condition, the intervals indicative of the value of said first condition being wholly limited to one predetermined range of variation and the intervals indicative of the value of said other condition being wholly limited to another distinct and non-overlapping range of variation.

10. The method of claim 9 which comprises the additional steps of detecting said signal pulses at the earth's surface, generating responsively thereto electric pulses having magnitudes corresponding to the respective intervals between said signal pulses, and separating said electric pulses into groups according to their respective magnitudes.

11. A method of signaling from the bottom of a bore hole which comprises measuring in said bore hole the varying values of at least two physical conditions existing therein, transmitting from said bore hole to the earth's surface a train of uniform signal pulses, and controlling the intervals between said pulses to transmit information concerning the varying values of said conditions, said information as to such conditions being transmitted sequentially in signaling cycles, such information being indicated by the intervals between at least some of the pulses in each cycle, at least one interval in each such signaling cycle being controlled and limited to a range of time duration lying wholly outside and non-overlapping with the ranges of time duration characteristic of the other intervals in such cycle, whereby the identities of the conditions whose values are signaled by such intervals in each said cycle are uniquely established.

12. The method of claim 11 wherein each signaling cycle is initiated by a reference interval which is longer than any of the other intervals in said signaling cycle, said long reference interval being indicative of the beginning of a signaling cycle.

13. Apparatus for signaling from the bottom of a bore hole while drilling, comprising a means for transmitting signal pulses from said bore hole to the earth's surface, first sensing means operative to measure the successive values of a first physical condition existing in said bore hole and to produce first signals indicative of the varying values of said first condition, second sensing means operative to measure the successive values of a second physical condition existing in said bore hole and to produce second signals indicative of the varying values of such second condition, control means for said pulse-transmitting means operative responsively to said first and second signals to actuate said pulse-transmitting means at controlled intervals, some of said controlled intervals being determined responsively to said first signals and others of said controlled intervals being determined responsively to said second signals, said control means having also means fixing the range of duration of the intervals determined by said first signals within predetermined limits and fixing the range of duration of the intervals determined by said second signals within other predetermined limits, said two ranges of duration being distinct and non-overlapping.

14. Apparatus for signaling from the bottom of a bore hole while drilling, comprising means for transmitting signal pulses from said bore hole to the earth's surface, first sensing means operative to measure the successive values of a first physical condition existing in said bore hole and to produce first signals indicative of the varying values of said first condition, second sensing means operative to measure the successive values of a second physical condition existing in said bore hole and to produce second signals indicative of the varying values of such second condition, control means for said pulse-transmitting means operative to actuate said pulse-transmitting means intermittently to produce a succession of cycles of said signal pulses, said control means being operative responsively to said first signal to define an interval between pulses in each of said cycles indicative of the value of said condition, said interval lying within predetermined duration limits, and operative responsively to said second signal to define another interval between pulses in each of said cycles indicative of the value of said second condition, said interval lying within predetermined duration limits, said control means having also means defining an interval at the beginning of each of said cycles which has a duration outside the limits of both said aforementioned intervals, and means at the surface of the earth for detecting said signal pulses.

15. In an apparatus for drilling a bore hole through subterranean formations, such apparatus being characterized by a hollow drill stem, a drill bit carried on the lower end thereof, and means for circulating drilling fluid through said drill stem, around said drill bit, and upward through the bore hole external of the drill stem, the combination which comprises means adjacent the lower end of the drill stem for measuring the resistivity of the formation being drilled, additional measuring means carried by said drill stem at a portion thereof above said first-mentioned measuring means, said additional means being operative to measure the resistivity of a formation adjoining said bore hole a substantial distance above said drill bit, and means, operative while drilling is in progress, for transmitting signals to the earth's surface that are indicative of the resistivity measurements made by said respective measuring means.

References Cited in the file of this patent

UNITED STATES PATENTS

| | | |
|---|---|---|
| 2,400,170 | Silverman | May 14, 1946 |
| 2,440,693 | Lee | May 4, 1948 |
| 2,544,569 | Silverman | Mar. 6, 1951 |
| 2,568,241 | Martin | Sept. 18, 1951 |
| 2,617,852 | Waters | Nov. 11, 1952 |
| 2,700,131 | Otis et al. | Jan. 18, 1955 |
| 2,708,261 | Thompson | May 10, 1955 |
| 2,755,431 | Scherbatskoy | July 17, 1956 |
| 2,806,946 | Rich | Sept. 17, 1957 |
| 2,821,627 | Pritchard | Jan. 28, 1958 |
| 2,901,685 | Alder | Aug. 25, 1959 |